United States Patent
Yamaguchi et al.

(10) Patent No.: US 8,000,063 B2
(45) Date of Patent: Aug. 16, 2011

(54) MAGNETO-RESISTIVE ELEMENT, THIN FILM MAGNETIC HEAD, MAGNETIC HEAD DEVICE, AND MAGNETIC RECORDING/REPRODUCING APPARATUS

(75) Inventors: Atsushi Yamaguchi, Tokyo (JP); Kei Hirata, Tokyo (JP); Satoshi Miura, Tokyo (JP); Yoshihiro Tsuchiya, Tokyo (JP); Kiyoshi Noguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 1152 days.

(21) Appl. No.: 11/623,493

(22) Filed: Jan. 16, 2007

(65) Prior Publication Data

US 2007/0242391 A1    Oct. 18, 2007

(30) Foreign Application Priority Data

Apr. 14, 2006  (JP) .................................. 2006-112462

(51) Int. Cl.
    *G11B 5/39*  (2006.01)
(52) U.S. Cl. ........................................................ 360/319
(58) Field of Classification Search .................... 360/319
    See application file for complete search history.

(56) References Cited

U.S. PATENT DOCUMENTS

| | | | | |
|---|---|---|---|---|
| 5,557,492 A * | 9/1996 | Gill et al. | ........................ | 360/319 |
| 5,883,762 A * | 3/1999 | Calhoun et al. | ................ | 205/119 |
| 5,976,713 A * | 11/1999 | Fuke et al. | ..................... | 428/811 |
| 6,721,140 B2 * | 4/2004 | Inoue et al. | .................... | 360/323 |
| 7,023,659 B2 * | 4/2006 | Honjo et al. | ................ | 360/125.5 |
| 7,446,983 B2 * | 11/2008 | Miyauchi et al. | ........ | 360/324.11 |
| 7,663,845 B2 | 2/2010 | Hirata et al. | | |
| 2003/0099069 A1 * | 5/2003 | Kagami et al. | ................. | 360/313 |
| 2003/0206379 A1 * | 11/2003 | Lin et al. | ........................ | 360/319 |
| 2005/0141137 A1 * | 6/2005 | Okada et al. | ................... | 360/122 |
| 2006/0119982 A1 * | 6/2006 | Honjo et al. | ................... | 360/126 |
| 2007/0035886 A1 * | 2/2007 | Kagami et al. | ................. | 360/319 |
| 2007/0242391 A1 * | 10/2007 | Yamaguchi et al. | .......... | 360/319 |
| 2009/0262464 A1 * | 10/2009 | Gill et al. | ....................... | 360/319 |

FOREIGN PATENT DOCUMENTS

| | | |
|---|---|---|
| JP | 4-196402 | 7/1992 |
| JP | 06-122990 | 5/1994 |
| JP | 7-66034 | 3/1995 |
| JP | 07-334819 | 12/1995 |
| JP | 08-124121 | 5/1996 |
| JP | 11-312303 | 11/1999 |
| JP | 2003-347120 | 12/2003 |

OTHER PUBLICATIONS

English machine translation of JP08-124121 to Hirohiko (pp. 1-6).*

* cited by examiner

*Primary Examiner* — Brian E Miller
(74) *Attorney, Agent, or Firm* — Oblon, Spivak, McClelland, Maier & Neustadt, L.L.P.

(57) ABSTRACT

A magneto-resistive element includes a lower magnetic shield film and a magneto-resistive film disposed above the lower magnetic shield film. The lower magnetic shield film includes a lower shield layer and an upper shield layer. The upper shield layer is amorphous or microcrystalline, made of a NiFe or CoFe composition containing B or P, and deposited on the lower shield layer. The lower shield layer is a magnetic conductive layer which is amorphous or microcrystalline with a crystal grain size equal to or less than 20 nm.

30 Claims, 9 Drawing Sheets

_3_

| Cap Layer | ─370 |
| Free Layer | ─360 |
| Barrier Layer | ─340 |
| Pinned Layer | ─330 |
| Antiferromagnetic Layer | ─320 |
| Buffer Layer | ─310 |

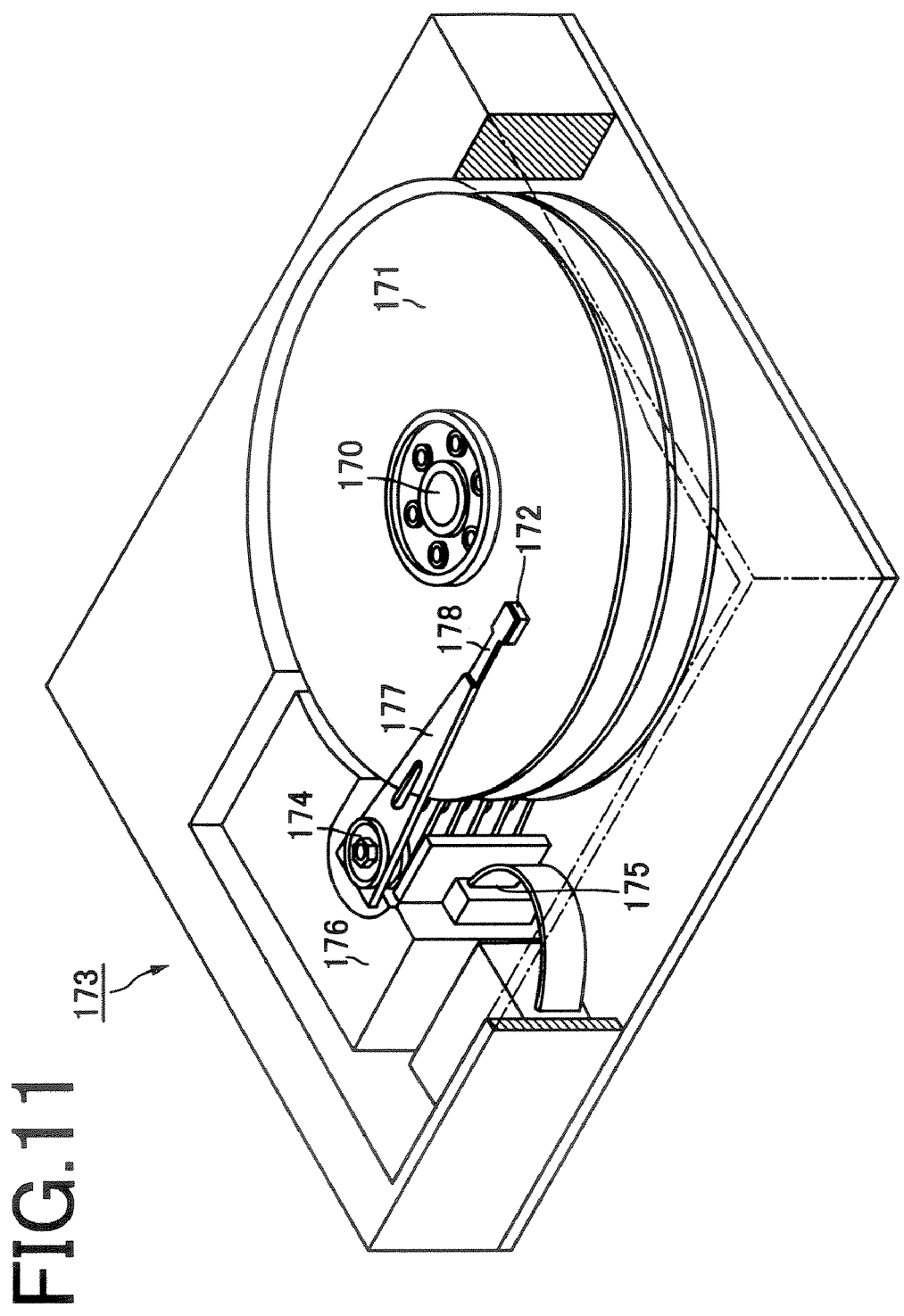

MAGNETO-RESISTIVE ELEMENT, THIN FILM MAGNETIC HEAD, MAGNETIC HEAD DEVICE, AND MAGNETIC RECORDING/REPRODUCING APPARATUS

BACKGROUND OF THE INVENTION

1. Field of the Invention

The present invention relates to a magneto-resistive element, a thin film magnetic head, a magnetic head device, and a magnetic recording/reproducing apparatus.

2. Description of the Related Art

Magneto-resistive elements are generally configured to have a magneto-resistive film above a lower magnetic shield film. Examples of the magneto-resistive film include a TMR (tunnel magneto-resistive) film and a CPP-GMR (current-perpendicular-to-plane giant magneto-resistive) film. MR change rates of the TMR and CPP-GMR films can improved by the following measures:

(1) For the TMR film, making a tunnel barrier layer out of crystalline magnesium oxide;

(2) For the CPP-GMR film, making a pinned or free layer out of an ordered Heusler alloy; and (3) For the TMR or CPP-GMR film, making an antiferromagnetic layer out of an ordered IrMn alloy.

In the case of (1), however, high temperature annealing at a temperature equal to or greater than 300° C. is required in the production process to obtain sufficient MR change rate by crystallizing magnesium oxide. Also in the cases of (2) and (3), high temperature annealing at a temperature equal to or greater than 300° C. is required in the production process to obtain sufficient MR change rate by ordering the Heusler alloy or the IrMn alloy. During the high temperature annealing, the lower magnetic shield film will also be exposed to a high temperature equal to or greater than 300° C.

Generally, the lower magnetic shield film is a magnetic shield film made of a NiFe or CoFe alloy. In this case, however, when the magnetic shield film is exposed to a high temperature equal to or greater than 300° C., there is a possibility that the crystal grains will be grown and coarsened within the film. Coarsening of the crystal grains leads to deterioration of soft magnetic properties important for the magnetic shield film. For example, it increases coercive force and decreases magnetic permeability.

Japanese Unexamined Patent Application Publication No. H07-066034 discloses a soft magnetic film having a composition with P (phosphorus) added to NiFe. Moreover, Japanese Unexamined Patent Application Publication No. H04-196402 discloses a soft magnetic film having a composition with B (boron) added to CoFe. However, mere addition of P or B is insufficient to inhibit the coarsening of the crystal grains under a high temperature environment equal to or greater than 300° C.

SUMMARY OF THE INVENTION

It is an object of the present invention to provide a magneto-resistive element whose magnetic shield film does not deteriorate in soft magnetic properties when exposed to a high temperature, for example, equal to or greater than 300° C., and a thin film magnetic head, a magnetic head device, and a magnetic recording/reproducing apparatus using the same.

According to a first aspect of the present invention, there is provided a magneto-resistive element comprising:

a lower magnetic shield film; and a magneto-resistive film disposed above the lower magnetic shield film, wherein the lower magnetic shield film includes a lower shield layer and an upper shield layer, the upper shield layer is amorphous or microcrystalline, made of a NiFe or CoFe composition containing B or P, and deposited on the lower shield layer, and the lower shield layer is a magnetic conductive layer which is amorphous or microcrystalline with a crystal grain size equal to or less than 20 nm.

In the above magneto-resistive element, the upper shield layer of the lower magnetic shield film is amorphous or microcrystalline and made of a NiFe or CoFe composition containing B or P. The inventors' study has revealed that mere addition of P or B is insufficient to inhibit the growth and coarsening of the crystal grains within the upper shield layer under a high temperature environment equal to or greater than 300° C.

In the present invention, the lower shield layer of the lower magnetic shield film is a magnetic conductive layer which is amorphous or microcrystalline with a crystal grain size equal to or less than 20 nm. Here, the above-mentioned upper shield layer is deposited on the lower shield layer. If the lower shield layer is neither amorphous nor microcrystalline, the upper shield layer to be deposited thereon will hardly be kept in an amorphous or microcrystalline state. When the lower shield layer is amorphous or microcrystalline as in the present invention, the upper shield layer can be kept in an amorphous or microcrystalline state even under a high temperature environment equal to or greater than 300° C., inhibiting the growth and coarsening of the crystal grains. Accordingly, deterioration of soft magnetic properties, such as increase in coercive force and decrease in magnetic permeability, can be prevented in the whole lower magnetic shield film including the lower shield layer and the upper shield layer.

Thus, the lower magnetic shield film can still serve as a magnetic shield even after exposed to a high temperature equal to or greater than 300° C. Therefore, high temperature annealing at a temperature equal to or greater than 300° C. can be performed in the production process of the magneto-resistive element without being restricted by the lower magnetic shield film, thereby improving the MR change rate.

According to a second aspect of the present invention, there is provided a magneto-resistive element comprising:

an upper magnetic shield film; and a magneto-resistive film disposed below the upper magnetic shield film, wherein the upper magnetic shield film includes a lower shield layer and an upper shield layer, the upper shield layer is amorphous or microcrystalline, made of a NiFe or CoFe composition containing B or P, and deposited on the lower shield layer, and the lower shield layer is a magnetic conductive layer which is amorphous or microcrystalline with a crystal grain size equal to or less than 20 nm.

The upper magnetic shield film according to the second aspect of the present invention has the same layered structure as the lower magnetic shield film according to the first aspect of the present invention. Hence, a redundant explanation is omitted.

According to a third aspect of the present invention, there is provided a magneto-resistive element comprising:

a lower magnetic shield film;

an upper magnetic shield film; and a magneto-resistive film disposed between the lower and upper magnetic shield films, wherein the lower and upper magnetic shield films each include a lower shield layer and an upper shield layer, the upper shield layer is amorphous or microcrystalline, made of a NiFe or CoFe composition containing B or P, and deposited on the lower shield layer, and the lower shield layer is a magnetic conductive layer which is amorphous or microcrystalline with a crystal grain size equal to or less than 20 nm.

According to the present invention, there are further provided a thin film magnetic head, a magnetic head device, and a magnetic recording/reproducing apparatus using the above magneto-resistive element.

As has been described hereinabove, the present invention provides a magneto-resistive element whose magnetic shield film does not deteriorate in soft magnetic properties when exposed to a high temperature, for example, equal to or greater than 300° C., and a thin film magnetic head, a magnetic head device, and a magnetic recording/reproducing apparatus using the same.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 11 is a perspective view of a magnetic recording/reproducing apparatus using the magnetic head device shown in FIGS. 9 and 10.

DESCRIPTION OF THE PREFERRED EMBODIMENTS

1. Magneto-Resistive Element

Figure 1:
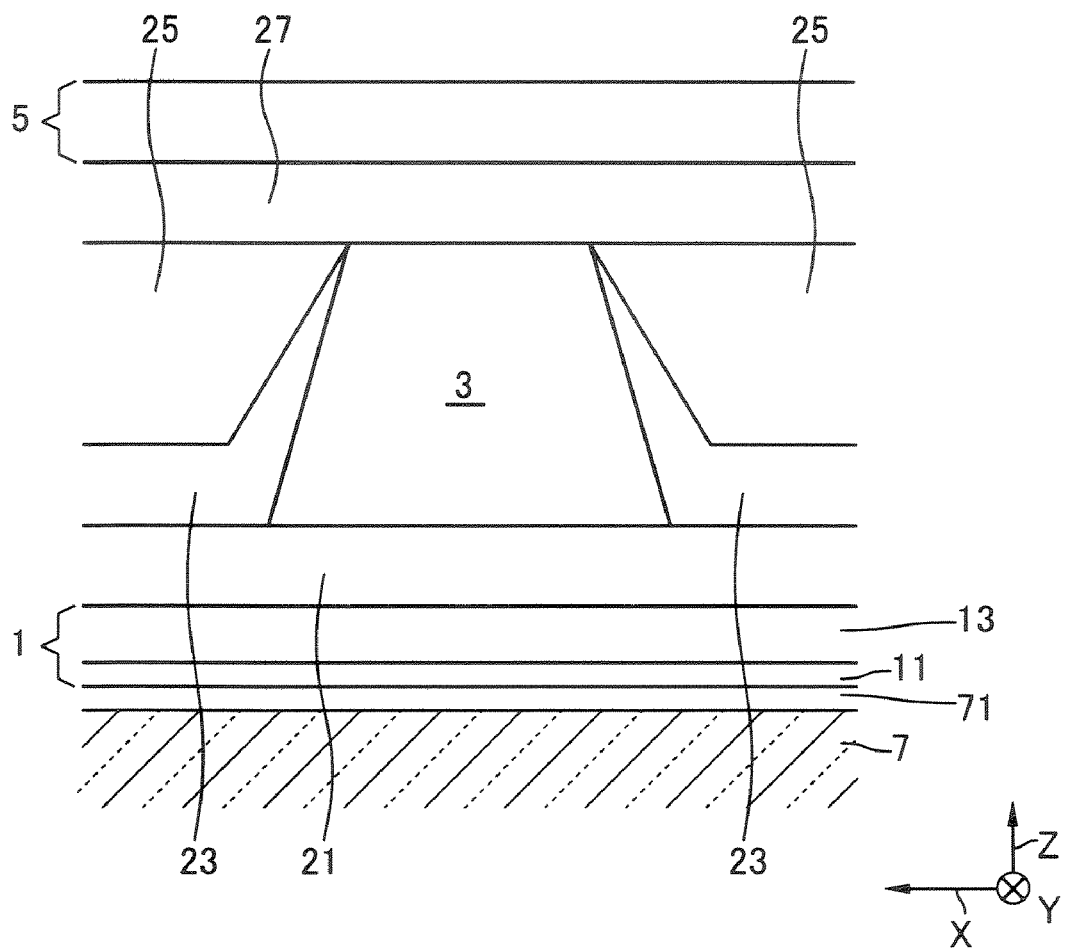
FIG. 1 is a diagram showing a magneto-resistive element according to one embodiment of the present invention.

Referring to FIG. 1, a magneto-resistive element according to one embodiment of the present invention comprises a lower magnetic shield film 1, a magneto-resistive film 3 and an upper magnetic shield film 5.

The lower magnetic shield film 1, which is disposed above a substrate 7 with an undercoat layer 71 interposed therebetween, has a layered structure of a lower shield layer 11 and an upper shield layer 13. The substrate 7 may be made of a ceramic material such as AlTiC ($Al_2O_3$—TiC). The undercoat layer 71 may be made of an electrical insulating material such as $Al_2O_3$ to ensure electrical insulation between the lower magnetic shield film 1 and the substrate 7.

The magneto-resistive film 3 is disposed above the lower magnetic shield film 1 with a lower gap film 21 interposed therebetween. The lower gap film 21 may be made of a conductive material such as Ta. Unlike in the illustrate embodiment, the magneto-resistive film 3 may be disposed immediately above the lower magnetic shield film 1. Examples of the magneto-resistive film 3 include a TMR film and a CPP-GMR film.

Figure 2:
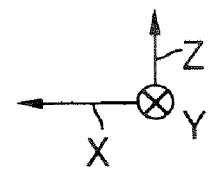
FIG. 2 is a diagram showing a film structure of a magneto-resistive film according to one embodiment of the present invention.

FIG. 2 shows a film structure where the magneto-resistive film 3 is a TMR film. Referring to FIG. 2, the magneto-resistive film 3 is formed by depositing a buffer layer 310, an antiferromagnetic layer 320, a pinned layer 330, a barrier layer 340, a free layer 360, and a cap layer 370 in the order named above. In the pinned layer 330, the direction of magnetization is pinned in one direction by exchange coupling with the antiferromagnetic layer 320. The barrier layer 340 functions as a tunnel barrier layer through which electron can pass while being kept in a spinning state owing to the tunnel effect. In The free layer 360, the direction of magnetization is allowed to change depending on external magnetic field such as a magnetic flux from a recording medium. From the standpoint of improving the MR ratio, the barrier layer 340 is preferably made of crystalline magnesium oxide (MgO), and the antiferromagnetic layer 320 is preferably made of an ordered IrMn alloy.

Figure 3:
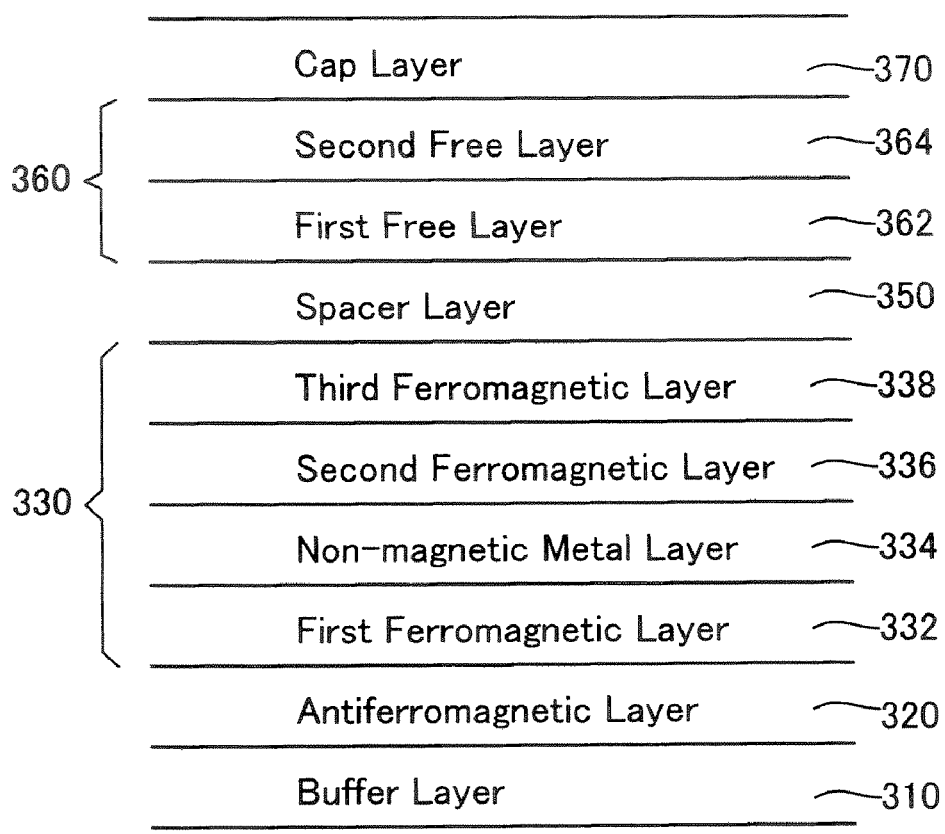
FIG. 3 is a diagram showing a film structure of a magneto-resistive film according to another embodiment of the present invention.
Figure 3:
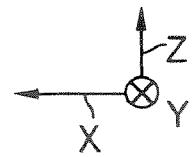

FIG. 3 shows a film structure where the magneto-resistive film 3 is a CPP-GMR film. Referring to FIG. 3, the magneto-resistive film 3 is formed by depositing a buffer layer 310, an antiferromagnetic layer 320, a pinned layer 330, a spacer layer 350, a free layer 360, and a cap layer 370 in the order named above. In the illustrated embodiment, the components similar to those in FIG. 2 are denoted by the same reference numerals and a redundant explanation is omitted. The pinned layer 330 is formed by depositing a first ferromagnetic layer 332, a non-magnetic metal layer 334, a second ferromagnetic layer 336, and a third ferromagnetic layer 338 in the order named above. The spacer layer 350 may be made of a non-magnetic conductive material such as Cu. The free layer 360 is formed by depositing a first free layer 362 and a second free layer 364. From the viewpoint of improving the MR ratio, both the third ferromagnetic layer 338 and the first free layer 362 are preferably made of a Heusler alloy.

Referring again to FIG. 1, an insulation layer 23 and a bias layer 25 are disposed above the lower gap film 21 at both sides of the magneto-resistive film 3.

The upper magnetic shield film 5 is disposed above the magneto-resistive film 3 with an upper gap film 27 interposed therebetween. The upper gap film 27 may be made of a conductive material such as Ru and Ti. The upper magnetic shield film 5 and the lower magnetic shield film 1 are spaced apart from each other with the magneto-resistive film 3 interposed therebetween.

The upper magnetic shield film 5 and the lower magnetic shield film 1 serve as a magnetic shield for the magneto-resistive film 3. In addition, when a TMR or CPP-GMR film is adopted as the magneto-resistive film 3, the upper magnetic shield film 5 and the lower magnetic shield film 1 also serve as an electric circuit for feeding current to the TMR or CPP-GMR film.

In the process of producing the magneto-resistive element shown in FIG. 1, the magneto-resistive film 3 is formed above the lower magnetic shield film 1 after formation of the lower magnetic shield film 1. In case of adopting MgO for the magneto-resistive film 3, high temperature annealing at a temperature equal to or greater than 300° C. is required to obtain sufficient MR change rate by crystallization of MgO. During the high temperature annealing, the lower magnetic shield film 1 is also exposed to a high temperature equal to or greater than 300° C.

In the magneto-resistive element shown in FIG. 1, the upper shield layer 13 of the lower magnetic shield film 1 is amorphous or microcrystalline and made of a NiFe or CoFe composition containing B or P. The inventors' study has revealed that merely making the upper shield layer 13 out of an amorphous or microcrystalline NiFe or CoFe composition containing B or P is insufficient to inhibit the growth and coarsening of the crystal grains within the upper shield layer 13 under a high temperature environment equal to or greater than 300° C. Coarsening of the crystal grains results in deterioration of soft magnetic properties, such as increase in coercive force and decrease in magnetic permeability.

In the illustrated embodiment, the lower shield layer 11 is a magnetic conductive layer which is amorphous or microcrystalline with a crystal grain size equal to or less than 20 nm. Here, the above-mentioned upper shield layer 13 is deposited on the lower shield layer 11. When the lower shield layer 11 is amorphous or microcrystalline, the upper shield layer 13 can be kept in an amorphous or microcrystalline state even under a high temperature environment equal to or greater than 300° C., inhibiting the growth and coarsening of the crystal grains. Accordingly, deterioration of soft magnetic properties, such as increase in coercive force and decrease in magnetic permeability, can be prevented in the whole lower magnetic shield film 1 including the lower shield layer 11 and the upper shield layer 13.

Thus, the lower magnetic shield film 1 can still serve as a magnetic shield even after exposed to a high temperature equal to or greater than 300° C. Therefore, high temperature annealing at a temperature equal to or greater than 300° C. can be performed in the production process of the magneto-resistive element without being restricted by the lower magnetic shield film 1, thereby improving the MR change rate.

Moreover, since the lower magnetic shield film 1 has a layered structure of the lower shield layer 11, which is a magnetic conductive layer, and the upper shield layer 13, electrolytic plating may be adopted for formation of the lower magnetic shield film 1. More specifically, the upper shield layer 13 may be deposited on the lower shield layer 11 by using the lower shield layer 11 as an electrode film for electrolytic plating. Electrolytic plating is superior to nonelectrolytic plating in high accuracy patterning.

Typically, the upper shield layer 13 may be a plated film by electrolytic plating. On the other hand, the lower shield layer 11 may be a sputtered film.

Preferably, the lower shield layer 11 is made of a NiFe or CoFe composition containing B or P. With this composition, the lower shield layer 11 can be made amorphous or microcrystalline with a crystal grain size equal to or less than 20 nm.

The content of B or P in the lower shield layer 11 preferably falls within the range of 1 to 10 at %, more preferably falls within the range of 1 to 5 at %. If the content of B or P in the lower shield layer 11 is equal to or less than 5 at %, the resistivity of the lower shield layer 11 decreases, which is advantageous for the plating process.

On the other hand, the content of B or P in the upper shield layer 13 preferably falls within the range of 0.3 to 10 at %.

According to one typical embodiment, the lower and upper shield layers 11 and 13 may each be made of a CoFe composition containing Co in the range of 96±3 at % with a total content of Co and Fe taken as 100 at %. If the Co content falls within the above range, the magnetostriction can be kept at a low value. Calculating from the above Co content, the Fe content is in the rage of 4±3 at %. Japanese Unexamined Patent Application Publication No. H04-196402 discloses on page 6, upper left column that: if the Fe content is less than 1 at %, the magnetostriction increases; and if the Fe content is more than 7 at %, the coercive force Hc increases, which also leads to an increase in magnetostriction.

According to another typical embodiment, the lower and upper shield layers 11 and 13 may each be made of a NiFe composition containing Ni in the range of 81±4 at % with a total content of Ni and Fe taken as 100 at %. If the Ni content falls within the above range, the magnetostriction can be kept at a low value.

Next will be described properties of the magnetic shield film with reference to experimental data.
Experiment 1

For Experiment 1, at first, a substrate was prepared from AlTiC. On the substrate, there was provided an undercoat layer of $Al_2O_3$.

Then, a lower shield layer was formed on the undercoat layer by sputtering. The lower shield layer was made of a NiFe composition containing B, more specifically, $(Ni_{y1}Fe_{100-y1})_{100-x1}B_{x1}$. The B content x1 of the lower shield layer was varied from 0 to 12 at %. Moreover, the Ni composition ratio y1 was set at 81 at %. The film thickness of the lower shield layer was set at 500 Å.

Next, electrolytic plating was performed using the lower shield layer as an electrode film, thereby forming an upper shield layer on the lower shield layer. The upper shield layer was made of a NiFe composition containing B, more specifically, $(Ni_{y2}Fe_{100-y2})_{100-x2}B_{x2}$. The B content x2 of the upper shield layer was varied from 0 to 10 at %. Moreover, the Ni composition ratio y2 was set at 81 at %. The film thickness of the upper shield layer was set at 1.5 m. Thus, the lower and upper shield layers were deposited to obtain a magnetic shield film.

After formation of the magnetic shield film above the substrate, annealing was performed at 350° C. Then, the magnetic shield film after annealing was measured for various properties. More specifically, the lower shield layer of the magnetic shield film was measured for grain size, magnetostriction and resistivity, while the upper shield layer was measured for grain size and magnetostriction. Moreover, the whole magnetic shield film was measured for resistivity, coercive force along hard axis (hereinafter referred to as "Hch") and magnetic permeability. The magnetic permeability was measured at a frequency of 10 MHz.

The experimental data are shown in Table 1.

TABLE 1

| | | Lower shield layer | | | | | Upper shield layer | | | | Properties of magnetic shield film | | |
| --- | --- | --- | --- | --- | --- | --- | --- | --- | --- | --- | --- | --- | --- |
| Sample No. | Annealing temperature (° C.) | Material | Content of B (at %) | Grain size (nm) | Magnetostriction ($\times 10^{-6}$) | Resistivity ($\mu\Omega cm$) | Material | Content of B (at %) | Grain size (nm) | Magnetostriction ($\times 10^{-6}$) | Resistivity ($\mu\Omega$) | Hch (Oe) | Magnetic Permeability (at 10 MHz) |
| 1 | 300 | NiFe | 0 | 30.0 | −1.00 | 25 | NiFe | 0 | 30 | −1.00 | 25 | 0.2 | 2200 |
| 2 | 350 | NiFe | 0 | >50 | −1.00 | 25 | NiFeB | 1 | 27.6 | −0.71 | 28 | 3.2 | 1100 |

TABLE 1-continued

| | | Lower shield layer | | | | | Upper shield layer | | | | Properties of magnetic shield film | | |
|---|---|---|---|---|---|---|---|---|---|---|---|---|---|
| Sample No. | Annealing temperature (° C.) | Material | Content of B (at %) | Grain size (nm) | Magneto-striction (×10$^{-6}$) | Resistivity (μΩcm) | Material | Content of B (at %) | Grain size (nm) | Magneto-striction (×10$^{-6}$) | Resistivity (μΩ) | Hch (Oe) | Magnetic Permeability (at 10 MHz) |
| 3 | 350 | NiFeB | 0.5 | 23.8 | −0.80 | 27 | NiFeB | 1 | 22.1 | −0.72 | 28 | 1.3 | 1400 |
| 4 | 350 | NiFeB | 1 | 18.8 | −0.66 | 28 | NiFeB | 1 | 18.5 | −0.70 | 28 | 0.2 | 2200 |
| 5 | 350 | NiFeB | 3 | 15.7 | −0.26 | 36 | NiFeB | 1 | 16.7 | −0.69 | 28 | 0.2 | 2200 |
| 6 | 350 | NiFeB | 5 | 13.8 | 0.18 | 46 | NiFeB | 1 | 15.7 | −0.72 | 28 | 0.2 | 2200 |
| 7 | 350 | NiFeB | 10 | 9.6 | 0.92 | 85 | NiFeB | 1 | 14.4 | −0.74 | 28 | 0.2 | 2200 |
| 8 | 350 | NiFeB | 12 | 8.3 | 1.12 | 105 | NiFeB | *(1) | Surface burning | | — | — | — |
| 9 | 350 | NiFeB | 5 | 13.8 | 0.18 | 46 | NiFeB | 0.3 | 17.1 | −0.68 | 26 | 0.3 | 2200 |
| 10 | 350 | NiFeB | 5 | 13.8 | 0.18 | 46 | NiFeB | 5 | 14.2 | 0.21 | 45 | 0.1 | 2100 |
| 11 | 350 | NiFeB | 5 | 13.8 | 0.18 | 46 | NiFeB | 10 | 13.9 | 0.93 | 87 | 0.1 | 2000 |

Sample 1 of Table 1 was prepared as a sample according to the prior art. In Sample 1, the B content was set at 0 for both the lower and upper shield layers. Moreover, the annealing temperature was set at 300° C.

In Sample 8, the B content of the upper shield layer is expressed by *(1), which means that plating was performed aiming at providing the upper shield layer with the B content of 1 at %.

Firstly, the B content of the lower shield layer will be discussed from the viewpoint of Hch and magnetic permeability of the magnetic shield film. When the B content of the lower shield layer was 1 at % or more (Samples 4 to 7), the Hch of the magnetic shield film was kept at an almost constant low value in the vicinity of 0.2 (Oe) (15.92 (A/m)). In addition, the magnetic permeability of the magnetic shield film was kept at an almost constant high value in the vicinity of 2200. This is though to be that setting the B content of the lower shield layer at 1 at % or more led to keeping the grain size of the lower shield layer at 20 nm or less, which inhibited the coarsening of the crystal grains in the upper shield layer.

On the other hand, when the B content of the lower shield layer was less than 1 at % (Samples 2 and 3), the Hch of the magnetic shield film rapidly increased to a value equal to or more than 1.3 (Oe) (103.48 (A/m)). In addition, the magnetic permeability of the magnetic shield film rapidly decreased to a value equal to or less than 1400. This is though to be that setting the B content of the lower shield layer at less than 1 at % led to increasing the grain size of the lower shield layer to more than 20 nm, which accelerated the coarsening of the crystal grains in the upper shield layer.

From the above, it is seen that keeping the Hch of the magnetic shield film at a low value and the magnetic permeability of the magnetic shield film at a high value can be achieved by setting the B content of the lower shield layer at 1 at % or more.

Secondly, the B content of the lower shield layer will be discussed from the viewpoint of formation of the upper shield layer by electrolytic plating. When the B content of the lower shield layer was 10 at % or less (Samples 2 to 7), the upper shield layer was properly formed on the lower shield layer without causing surface burning. This is though to be that setting the B content of the lower shield layer at 10 at % or less led to keeping the resistivity of the lower shield layer at a low value, which did not obstruct the plating process.

On the other hand, when the B content of the lower shield layer was more than 10 at % (Sample 8), the upper shield layer could not be properly formed due to surface burning. This is though to be that setting the B content of the lower shield layer at more than 10 at % led to increasing the resistivity of the lower shield layer, which obstructed the plating process.

From the above, it is seen that formation of the upper shield layer without causing surface burning can be achieved by setting the B content of the lower shield layer at 10 at % or less.

Finally, the B content of the upper shield layer will be discussed. As seen in Samples 6, 9 to 11, excellent soft magnetic properties for the magnetic shield film, such as low Hch and high magnetic permeability, can be obtained by setting the B content of the upper shield layer within the range of 0.3 to 10 at %.

Experiment 2

The details of Experiment 2 identical to those of Experiment 1 are omitted here. In Experiment 2, the lower shield layer was made of a CoFe composition containing B, more specifically, $(Co_{y3}Fe_{100-y3})_{100-x1}B_{x1}$. The Co composition ratio y3 of the lower shield layer was set at 95 at %. On the other hand, the upper shield layer was made of a CoFe composition containing B, more specifically, $(Co_{y4}Fe_{100-y4})_{100-x2}B_{x2}$. The Co composition ratio y4 of the upper shield layer was set at 95 at %.

The experimental data are shown in Table 2.

TABLE 2

| | | Lower shield layer | | | | | Upper shield layer | | | | Properties of magnetic shield film | | |
|---|---|---|---|---|---|---|---|---|---|---|---|---|---|
| Sample No. | Annealing temperature (° C.) | Material | Content of B (at %) | Grain size (nm) | Magneto-striction (×10$^{-6}$) | Resistivity (μΩcm) | Material | Content of B (at %) | Grain size (nm) | Magneto-striction (×10$^{-6}$) | Resistivity (μΩ) | Hch (Oe) | Magnetic Permeability (at 10 MHz) |
| 12 | 350 | CoFe | 0 | >50 | −0.51 | 20 | CoFeB | 1 | 28.6 | −0.51 | 25 | 4.8 | 1000 |
| 13 | 350 | CoFeB | 0.5 | 26.8 | −0.42 | 23 | CoFeB | 1 | 23 | −0.49 | 25 | 1.7 | 1200 |
| 14 | 350 | CoFeB | 1 | 19.5 | −0.34 | 25 | CoFeB | 1 | 19.3 | −0.48 | 25 | 0.5 | 1970 |
| 15 | 350 | CoFeB | 3 | 16.5 | 0.04 | 34 | CoFeB | 1 | 17 | −0.52 | 25 | 0.5 | 1970 |
| 16 | 350 | CoFeB | 5 | 14.6 | 0.39 | 45 | CoFeB | 1 | 16 | −0.52 | 25 | 0.5 | 1970 |
| 17 | 350 | CoFeB | 10 | 10.5 | 0.94 | 85 | CoFeB | 1 | 14.9 | −0.51 | 25 | 0.5 | 1970 |

TABLE 2-continued

| | | Lower shield layer | | | | | Upper shield layer | | | Properties of magnetic shield film | | |
|---|---|---|---|---|---|---|---|---|---|---|---|---|
| Sample No. | Annealing temperature (° C.) | Material | Content of B (at %) | Grain size (nm) | Magneto-striction (×10$^{-6}$) | Resistivity (μΩcm) | Material | Content of B (at %) | Grain size (nm) | Magneto-striction (×10$^{-6}$) | Resistivity (μΩ) | Hch (Oe) | Magnetic Permeability (at 10 MHz) |
| 18 | 350 | CoFeB | 12 | 8.6 | 1.12 | 102 | CoFeB | *(1) | Surface burning | — | — | — |
| 19 | 350 | CoFeB | 5 | 14.6 | 0.39 | 45 | CoFeB | 0.3 | 18.1 | −0.34 | 22 | 0.7 | 1970 |
| 20 | 350 | CoFeB | 5 | 14.6 | 0.39 | 45 | CoFeB | 5 | 15.3 | 0.49 | 47 | 0.3 | 1900 |
| 21 | 350 | CoFeB | 5 | 14.6 | 0.39 | 45 | CoFeB | 10 | 14.7 | 0.96 | 88 | 0.2 | 1800 |

In Sample 18 of Table 2, the B content of the upper shield layer is expressed by *(1), which means that plating was performed aiming at providing the upper shield layer with the B content of 1 at %.

Firstly, the B content of the lower shield layer will be discussed from the viewpoint of Hch and magnetic permeability of the magnetic shield film. When the B content of the lower shield layer was 1 at % or more (Samples 14 to 17), the Hch of the magnetic shield film was kept at an almost constant low value in the vicinity of 0.5 (Oe) (39.8 (A/m)). In addition, the magnetic permeability of the magnetic shield film was kept at an almost constant high value in the vicinity of 2000.

On the other hand, when the B content of the lower shield layer was less than 1 at % (Samples 12 and 13), the Hch of the magnetic shield film rapidly increased to a value equal to or more than 1.7 (Oe) (135.32 (A/m)). In addition, the magnetic permeability of the magnetic shield film rapidly decreased to a value equal to or less than 1200.

From the above, it is seen that keeping the Hch of the magnetic shield film at a low value and the magnetic permeability of the magnetic shield film at a high value can be achieved by setting the B content of the lower shield layer at 1 at % or more.

Secondly, the B content of the lower shield layer will be discussed from the viewpoint of formation of the upper shield layer by electrolytic plating. When the B content of the lower shield layer was 10 at % or less (Samples 12 to 17), the upper shield layer was properly formed on the lower shield layer without causing surface burning.

On the other hand, when the B content of the lower shield layer was more than 10 at % (Sample 18), the upper shield layer could not be properly formed due to surface burning.

From the above, it is seen that formation of the upper shield layer without causing surface burning can be achieved by setting the B content of the lower shield layer at 10 at % or less.

Finally, the B content of the upper shield layer will be discussed. As seen in Samples 16, 19 to 21, excellent soft magnetic properties for the magnetic shield film, such as low Hch and high magnetic permeability, can be obtained by setting the B content of the upper shield layer within the range of 0.3 to 10 at %.

Experiment 3

The details of Experiment 3 identical to those of Experiment 1 are omitted here. In Experiment 3, the lower shield layer was made of a NiFe composition containing P, more specifically, $(Ni_{y1}Fe_{100-y1})_{100-x3}P_{x3}$. The P content x3 of the lower shield layer was varied from 0 to 12 at %. On the other hand, the upper shield layer was made of a NiFe composition containing P, more specifically, $(Ni_{y2}Fe_{100-y2})_{100-x4}P_{x4}$. The P content x4 of the upper shield layer was varied from 0 to 10 at %. The other conditions, such as Ni composition ratio y1 of the lower shield layer and Ni composition ratio y2 of the upper shield layer, are the same as in Experiment 1.

The experimental data are shown in Table 3.

TABLE 3

| | | Lower shield layer | | | | | Upper shield layer | | | Properties of magnetic shield film | | |
|---|---|---|---|---|---|---|---|---|---|---|---|---|
| Sample No. | Annealing temperature (° C.) | Material | Content of P (at %) | Grain size (nm) | Magneto-striction (×10$^{-6}$) | Resistivity (μΩcm) | Material | Content of P (at %) | Grain size (nm) | Magneto-striction (×10$^{-6}$) | Resistivity (μΩ) | Hch (Oe) | Magnetic Permeability (at 10 MHz) |
| 1 | 300 | NiFe | 0 | 30.0 | −1.00 | 25 | NiFe | 0 | 30 | −1.00 | 25 | 0.2 | 2500 |
| 22 | 350 | NiFe | 0 | >50 | −1.00 | 25 | NiFeP | 1 | 27.6 | −0.77 | 32 | 2.2 | 1200 |
| 23 | 350 | NiFeP | 0.5 | 23.4 | −0.80 | 30 | NiFeP | 1 | 21.5 | −0.75 | 32 | 1.1 | 1300 |
| 24 | 350 | NiFeP | 1 | 18.3 | −0.73 | 33 | NiFeP | 1 | 17.5 | −0.76 | 32 | 0.1 | 1980 |
| 25 | 350 | NiFeP | 3 | 15.0 | −0.34 | 45 | NiFeP | 1 | 16.0 | −0.75 | 32 | 0.1 | 1980 |
| 26 | 350 | NiFeP | 5 | 12.6 | 0.08 | 59 | NiFeP | 1 | 14.9 | −0.77 | 32 | 0.1 | 1980 |
| 27 | 350 | NiFeP | 10 | 8.7 | 0.80 | 97 | NiFeP | 1 | 13.0 | −0.78 | 32 | 0.1 | 1980 |
| 28 | 350 | NiFeP | 12 | 7.4 | 1.01 | 113 | NiFeP | *(1) | Surface burning | — | — | — |
| 29 | 350 | NiFeP | 5 | 13.8 | 0.08 | 59 | NiFeP | 0.3 | 16.1 | −0.70 | 28 | 0.1 | 1980 |
| 30 | 350 | NiFeP | 5 | 13.8 | 0.08 | 59 | NiFeP | 5 | 13.9 | 0.15 | 57 | 0.1 | 1900 |
| 31 | 350 | NiFeP | 5 | 13.8 | 0.08 | 59 | NiFeP | 10 | 12.7 | 0.87 | 99 | 0 | 1800 |

Sample 1 of Table 3 was the same as in Table 1 and prepared as a sample according to the prior art.

In Sample 28, the P content of the upper shield layer is expressed by *(1), which means that plating was performed aiming at providing the upper shield layer with the P content of 1 at %.

Firstly, the P content of the lower shield layer will be discussed from the viewpoint of Hch and magnetic permeability of the magnetic shield film. When the P content of the lower shield layer was 1 at % or more (Samples 24 to 27), the Hch of the magnetic shield film was kept at an almost constant low value in the vicinity of 0.1 (Oe) (7.96 (A/m)). In addition, the magnetic permeability of the magnetic shield film was kept at an almost constant high value in the vicinity of 2000. This is though to be that setting the P content of the lower shield layer at 1 at % or more led to keeping the grain size of the lower shield layer at 20 nm or less, which inhibited the coarsening of the crystal grains in the upper shield layer.

On the other hand, when the P content of the lower shield layer was less than 1 at % (Samples 22 and 23), the Hch of the magnetic shield film rapidly increased to a value equal to or more than 1.1 (Oe) (87.56 (A/m)). In addition, the magnetic permeability of the magnetic shield film rapidly decreased to a value equal to or less than 1300. This is though to be that setting the P content of the lower shield layer at less than 1 at % led to increasing the grain size of the lower shield layer to more than 20 nm, which accelerated the coarsening of the crystal grains in the upper shield layer.

Finally, the P content of the upper shield layer will be discussed. As seen in Samples 26, 29 to 31, excellent soft magnetic properties for the magnetic shield film, such as low Hch and high magnetic permeability, can be obtained by setting the P content of the upper shield layer within the range of 0.3 to 10 at %.

Experiment 4

The details of Experiment 4 identical to those of Experiment 3 are omitted here. In Experiment 4, the lower shield layer was made of a CoFe composition containing P, more specifically, $(Co_{y3}Fe_{100-y3})_{100-x3}P_{x3}$. The Co composition ratio y3 of the lower shield layer was set at 95 at %. On the other hand, the upper shield layer was made of a CoFe composition containing P, more specifically, $(Co_{y4}Fe_{100-y4})_{100-x4}P_{x4}$. The Co composition ratio y4 of the upper shield layer was set at 95 at %.

The experimental data are shown in Table 4.

TABLE 4

| Sample No. | Annealing temperature (°C.) | Lower shield layer | | | | | Upper shield layer | | | | Properties of magnetic shield film | | |
|---|---|---|---|---|---|---|---|---|---|---|---|---|---|
| | | Material | Content of P (at %) | Grain size (nm) | Magneto-striction (×10⁻⁶) | Resistivity (μΩcm) | Material | Content of P (at %) | Grain size (nm) | Magneto-striction (×10⁻⁶) | Resistivity (μΩ) | Hch (Oe) | Magnetic Permeability (at 10 MHz) |
| 32 | 350 | CoFe | 0 | >50 | −0.51 | 20 | CoFeP | 1 | 28.6 | −0.05 | 30 | 4.2 | 900 |
| 33 | 350 | CoFeP | 0.5 | 26.4 | −0.40 | 24 | CoFeP | 1 | 22.5 | −0.11 | 30 | 1.4 | 1100 |
| 34 | 350 | CoFeP | 1 | 19.2 | −0.35 | 28 | CoFeP | 1 | 19.0 | −0.07 | 30 | 0.3 | 1780 |
| 35 | 350 | CoFeP | 3 | 15.5 | −0.05 | 41 | CoFeP | 1 | 16.2 | −0.14 | 30 | 0.3 | 1780 |
| 36 | 350 | CoFeP | 5 | 13.7 | 0.18 | 55 | CoFeP | 1 | 15.2 | −0.12 | 30 | 0.3 | 1780 |
| 37 | 350 | CoFeP | 10 | 9.6 | 0.74 | 94 | CoFeP | 1 | 13.7 | −0.13 | 30 | 0.3 | 1780 |
| 38 | 350 | CoFeP | 12 | 7.8 | 0.97 | 108 | CoFeP | *(1) | Surface burning | — | — | — | — |
| 39 | 350 | CoFeP | 5 | 13.7 | 0.18 | 55 | CoFeP | 0.3 | 16.5 | −0.22 | 27 | 0.4 | 1780 |
| 40 | 350 | CoFeP | 5 | 13.7 | 0.18 | 55 | CoFeP | 5 | 14.5 | 0.26 | 56 | 0.2 | 1700 |
| 41 | 350 | CoFeP | 5 | 13.7 | 0.18 | 55 | CoFeP | 10 | 13.6 | 0.85 | 97 | 0.1 | 1600 |

From the above, it is seen that keeping the Hch of the magnetic shield film at a low value and the magnetic permeability of the magnetic shield film at a high value can be achieved by setting the P content of the lower shield layer at 1 at % or more.

Secondly, the P content of the lower shield layer will be discussed from the viewpoint of formation of the upper shield layer by electrolytic plating. When the P content of the lower shield layer was 10 at % or less (Samples 22 to 27), the upper shield layer was properly formed on the lower shield layer without causing surface burning. This is though to be that setting the P content of the lower shield layer at 10 at % or less led to keeping the resistivity of the lower shield layer at a low value, which did not obstruct the plating process.

On the other hand, when the P content of the lower shield layer was more than 10 at % (Sample 28), the upper shield layer could not be properly formed due to surface burning. This is though to be that setting the P content of the lower shield layer at more than 10 at % led to increasing the resistivity of the lower shield layer, which obstructed the plating process.

From the above, it is seen that formation of the upper shield layer without causing surface burning can be achieved by setting the P content of the lower shield layer at 10 at % or less.

In Sample 38 of Table 4, the P content of the upper shield layer is expressed by *(1), which means that plating was performed aiming at providing the upper shield layer with the P content of 1 at %.

Firstly, the P content of the lower shield layer will be discussed from the viewpoint of Hch and magnetic permeability of the magnetic shield film. When the P content of the lower shield layer was 1 at % or more (Samples 34 to 37), the Hch of the magnetic shield film was kept at an almost constant low value in the vicinity of 0.3 (Oe) (23.88 (A/m)). In addition, the magnetic permeability of the magnetic shield film was kept at an almost constant high value in the vicinity of 1800.

On the other hand, when the P content of the lower shield layer was less than 1 at % (Samples 32 and 33), the Hch of the magnetic shield film rapidly increased to a value equal to or more than 1.4 (Oe) (111.44 (A/m)). In addition, the magnetic permeability of the magnetic shield film rapidly decreased to a value equal to or less than 1100.

From the above, it is seen that keeping the Hch of the magnetic shield film at a low value and the magnetic permeability of the magnetic shield film at a high value can be achieved by setting the P content of the lower shield layer at 1 at % or more.

Secondly, the P content of the lower shield layer will be discussed from the viewpoint of formation of the upper shield layer by electrolytic plating. When the P content of the lower shield layer was 10 at % or less (Samples 32 to 37), the upper shield layer was properly formed on the lower shield layer without causing surface burning.

On the other hand, when the P content of the lower shield layer was more than 10 at % (Sample 38), the upper shield layer could not be properly formed due to surface burning.

From the above, it is seen that formation of the upper shield layer without causing surface burning can be achieved by setting the P content of the lower shield layer at 10 at % or less.

Finally, the P content of the upper shield layer will be discussed. As seen in Samples 36, 39 to 41, excellent soft magnetic properties for the magnetic shield film, such as low Hch and high magnetic permeability, can be obtained by setting the P content of the upper shield layer within the range of 0.3 to 10 at %.

Next will be described combinations of magneto-resistive film and magnetic shield film with reference to experimental data.

Experiment 5

A magneto-resistive film (hereinafter referred to as "first magneto-resistive film") was prepared to have the same film structure as shown in FIG. 2, wherein the antiferromagnetic layer 320 and the barrier layer 340 were made of IrMn and MgO, respectively. Then, the first magneto-resistive film was measured for MR change rate after annealing. The annealing temperature was set at 250, 300, 320, 350, 380 and 400° C. Moreover, the obtained MR change rates were standardized by the MR change rate at an annealing temperature of 250° C. Hereinafter, the standardized MR change rate is referred to as "MR change rate ratio".

Furthermore, the magnetic shield films of Samples 1, 5, 15, 25 and 35 obtained in Experiments 1 to 4 were measured for magnetic permeability after annealing. As with the above magneto-resistive film, the annealing temperature was set at 250, 300, 320, 350, 380 and 400° C.

The experimental data are shown in Table 5.

magnetic shield film. Curves L1 to L5 represent annealing temperature versus magnetic permeability characteristics of the magnetic shield films of Samples 1, 5, 15, 25 and 35, respectively.

Here will be discussed annealing temperature with reference to the bar chart shown in FIG. 4. The first magneto-resistive film had a higher MR change rate at an annealing temperature equal to or greater than 300° C. than at an annealing temperature of 250° C. In other words, high temperature annealing at a temperature equal to or greater than 300° C. is required to obtain a higher MR change rate. During the high temperature annealing, the magnetic shield film will also be exposed to a high temperature equal to or greater than 300° C.

In the magnetic shield film of Sample 1 (according to the prior art), however, increasing the annealing temperature to 300° C. or more caused a decrease in magnetic permeability, as indicated by the curve L1. For example, when the annealing temperature was 350° C., the magnetic permeability dropped to less than half of the standard value at an annealing temperature of 250° C. Thus, high temperature annealing cannot be adopted when the magnetic shield film of Sample 1 is combined with the first magneto-resistive film. As a result, it is impossible to improve the MR change rate.

In the magnetic shield films of Samples 5, 15, 25 and 35 (according to the present invention), on the other hand, increasing the annealing temperature to 300° C. or more hardly caused a decrease in magnetic permeability, as indicated by the curves L2 to L5. Thus, the adoption of the high temperature annealing becomes possible by combining the magnetic shield films of Samples 5, 15, 25 and 35 with the first magneto-resistive film, which enables improvement of MR change rate without limitation.

Experiment 6

The details of Experiment 6 identical to those of Experiment 5 are omitted here. In Experiment 6, a magneto-resistive film (hereinafter referred to as "second magneto-resistive film") was prepared to have the same film structure as shown in FIG. 3, wherein the third ferromagnetic layer 338 and the first free layer 362 were both made of a Heusler alloy

TABLE 5

| Annealing temperature (° C.) | MR change rate ratio First magneto-resistive film | Magnetic permeability | | | | |
|---|---|---|---|---|---|---|
| | | Magnetic shield film of Sample 1 Lower shield layer: NiFe Upper shield layer: NiFe | Magnetic shield film of Sample 5 Lower shield layer: NiFeB Upper shield layer: NiFeB | Magnetic shield film of Sample 15 Lower shield layer: CoFeB Upper shield layer: CoFeB | Magnetic shield film of Sample 25 Lower shield layer: NiFeP Upper shield layer: NiFeP | Magnetic shield film of Sample 35 Lower shield layer: CoFeP Upper shield layer: CoFeP |
| 250 | 100% | 2280 | 2200 | 1980 | 2030 | 1780 |
| 300 | 123% | 2200 | 2230 | 1980 | 2040 | 1770 |
| 320 | 133% | 1540 | 2220 | 2020 | 1990 | 1800 |
| 350 | 145% | 1000 | 2200 | 1970 | 1980 | 1780 |
| 380 | 142% | 600 | 2160 | 1920 | 1970 | 1750 |
| 400 | 122% | 400 | 2080 | 1880 | 1900 | 1700 |

Figure 4:
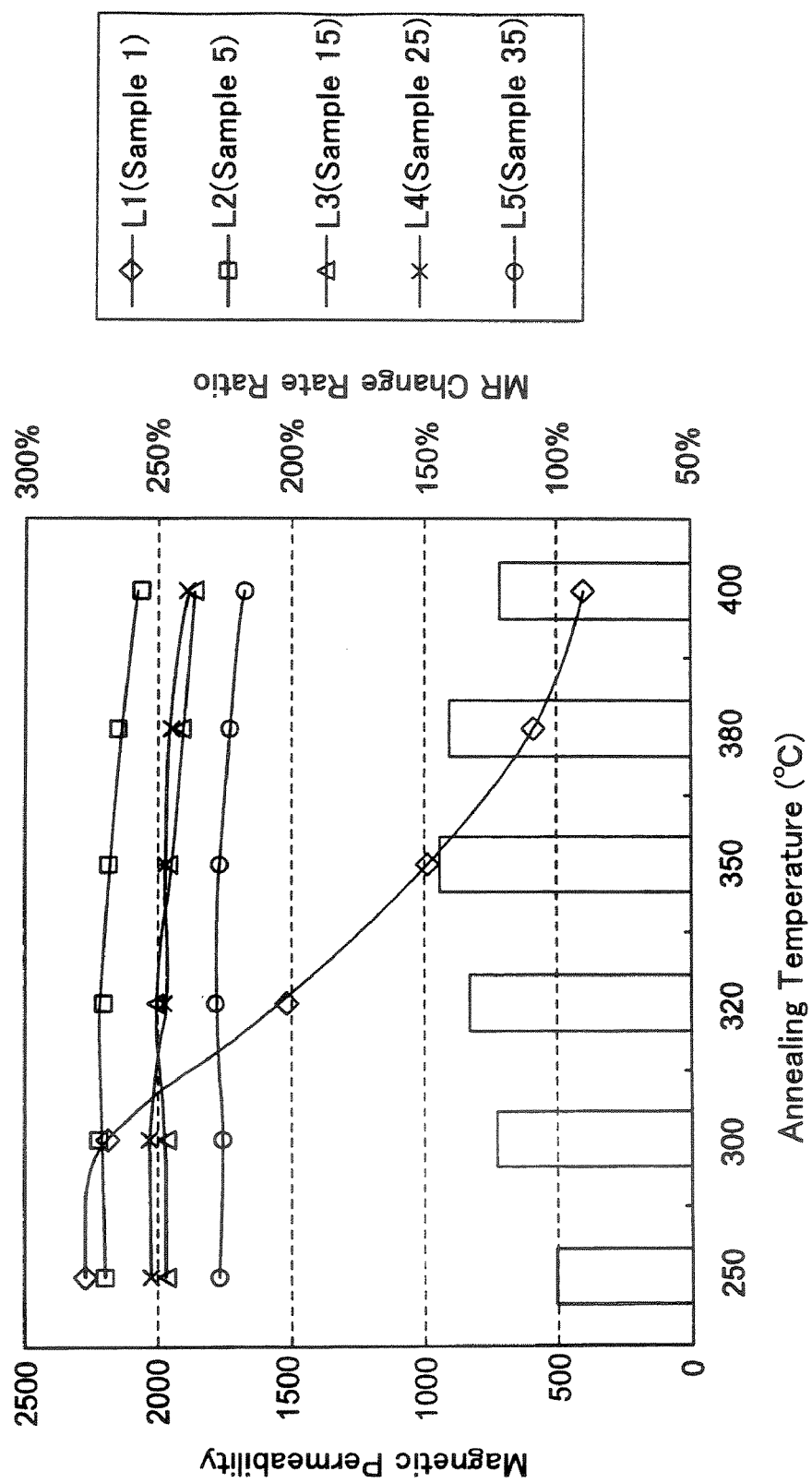
FIG. 4 is a plot of experimental data shown in Table 5.

For visual understanding, the experimental data of Table 5 are plotted in FIG. 4. In FIG. 4, the abscissa represents annealing temperature (° C.). The right-hand ordinate represents MR change rate ratio of the magneto-resistive film, while the left-hand ordinate represents magnetic permeability of the ($Co_2MnSi$). Then, the second magneto-resistive film was measured for MR change rate after annealing. The annealing temperature was set in the same manner as in Experiment 5. Moreover, the obtained MR change rates were standardized by the MR change rate at an annealing temperature of 250° C.

The experimental data are shown in Table 6.

TABLE 6

| Annealing temperature (° C.) | MR change rate ratio Second magneto-resistive film | Magnetic permeability | | | | |
|---|---|---|---|---|---|---|
| | | Magnetic shield film of Sample 1 Lower shield layer: NiFe Upper shield layer: NiFe | Magnetic shield film of Sample 5 Lower shield layer: NiFeB Upper shield layer: NiFeB | Magnetic shield film of Sample 15 Lower shield layer: CoFeB Upper shield layer: CoFeB | Magnetic shield film of Sample 25 Lower shield layer: NiFeP Upper shield layer: NiFeP | Magnetic shield film of Sample 35 Lower shield layer: CoFeP Upper shield layer: CoFeP |
| 250 | 103% | 2280 | 2200 | 1980 | 2030 | 1780 |
| 300 | 108% | 2200 | 2230 | 1980 | 2040 | 1770 |
| 320 | 137% | 1540 | 2220 | 2020 | 1990 | 1800 |
| 350 | 284% | 1000 | 2200 | 1970 | 1980 | 1780 |
| 380 | 348% | 600 | 2160 | 1920 | 1970 | 1750 |
| 400 | 343% | 400 | 2080 | 1880 | 1900 | 1700 |

In Table 6, the experimental data about the magnetic shield films of Samples 1, 5, 15, 25 and 35 are the same as in Table 5.

Figure 5:
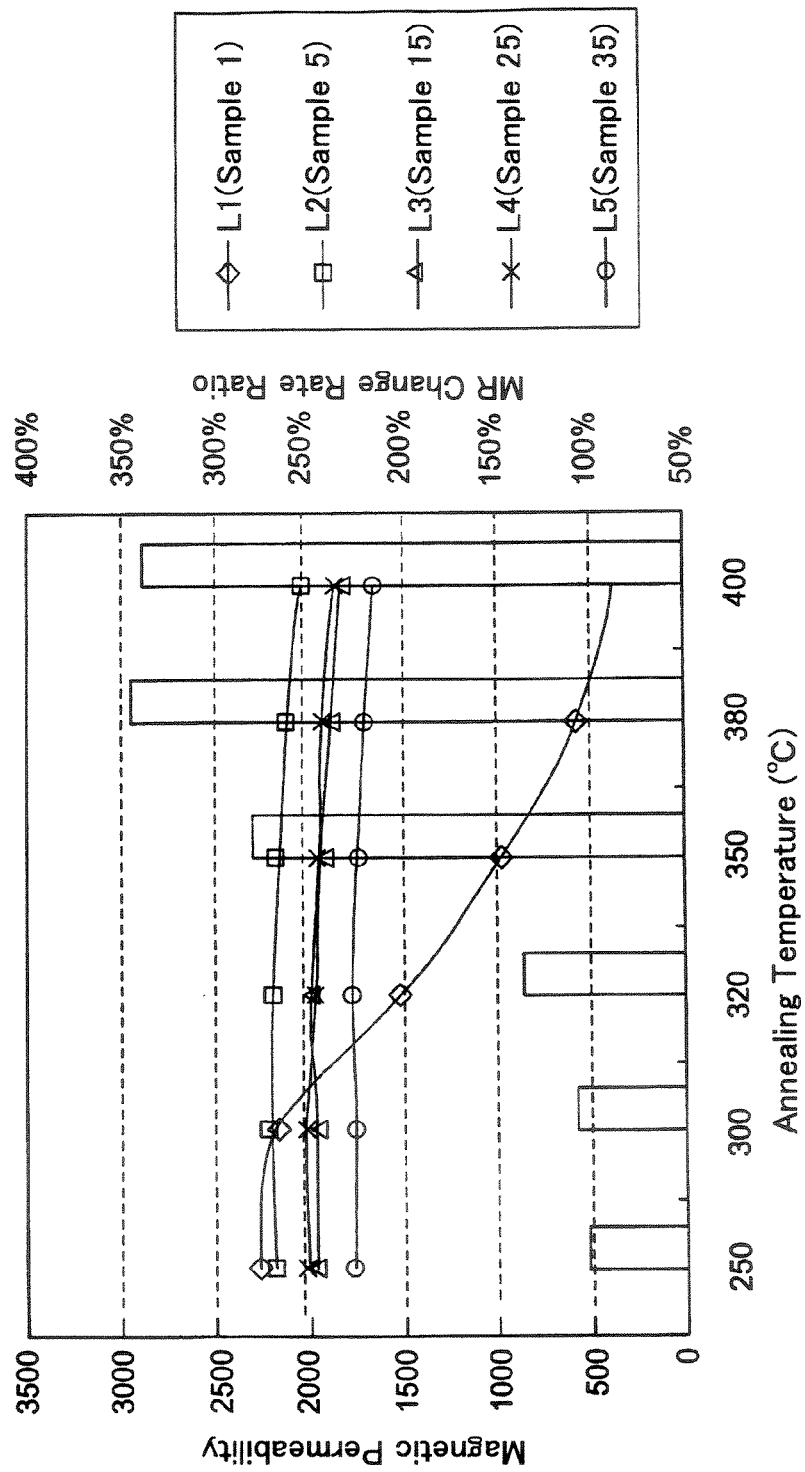
FIG. 5 is a plot of experimental data shown in Table 6.

For visual understanding, the experimental data of Table 6 are plotted in FIG. 5. In FIG. 5, the abscissa, the right-hand ordinate and the left-hand ordinate are similar to those in FIG. 4.

Here will be discussed annealing temperature with reference to the bar chart shown in FIG. 5. As with the first magneto-resistive film discussed above, the second magneto-resistive film had a higher MR change rate at an annealing temperature equal to or greater than 300° C. than at an annealing temperature of 250° C. In other words, high temperature annealing at a temperature equal to or greater than 300° C. is required to obtain a higher MR change rate. During the high temperature annealing, the magnetic shield film will also be exposed to a high temperature equal to or greater than 300° C.

In the magnetic shield films of Samples 5, 15, 25 and 35 (according to the present invention), increasing the annealing temperature to 300° C. or more hardly caused a decrease in magnetic permeability, as indicated by the curves L2 to L5. Thus, the adoption of the high temperature annealing becomes possible by combining the magnetic shield films of Samples 5, 15, 25 and 35 with the second magneto-resistive film, which enables improvement of MR change rate without limitation.

It should be noted that although the present invention has been described hereinabove with reference to one preferred embodiment where the lower magnetic shield film 1 has a layered structure of the lower and upper shield layers 11 and 13, the present invention should not be understood as limited to the foregoing embodiment. For example, the same effects and advantages can be obtained by adopting the layered structure of the lower and upper shield layers 11 and 13 for the upper magnetic shield film 5. The layered structure of the lower and upper shield layers 11 and 13 may also be adopted for both the lower and upper magnetic shield films.

2. Thin Film Magnetic Head

Figure 6:
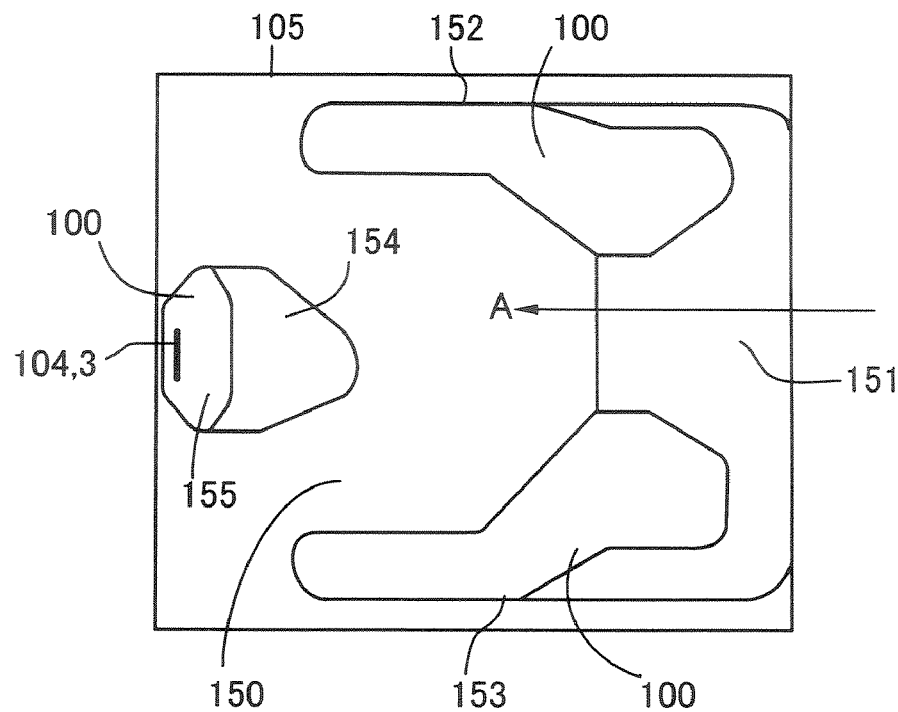
FIG. 6 is a plan view showing a medium-facing side of a thin film magnetic head according to one embodiment of the present invention.
Figure 7:
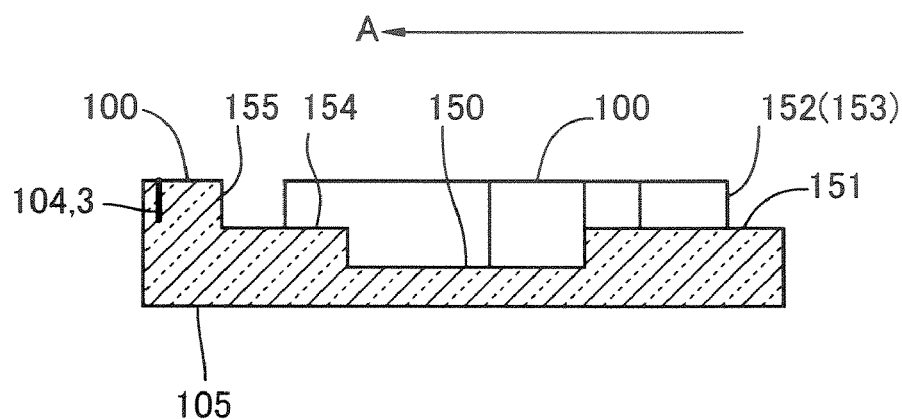
FIG. 7 is a front sectional view of the thin film magnetic head shown in FIG. 6.
Figure 8:
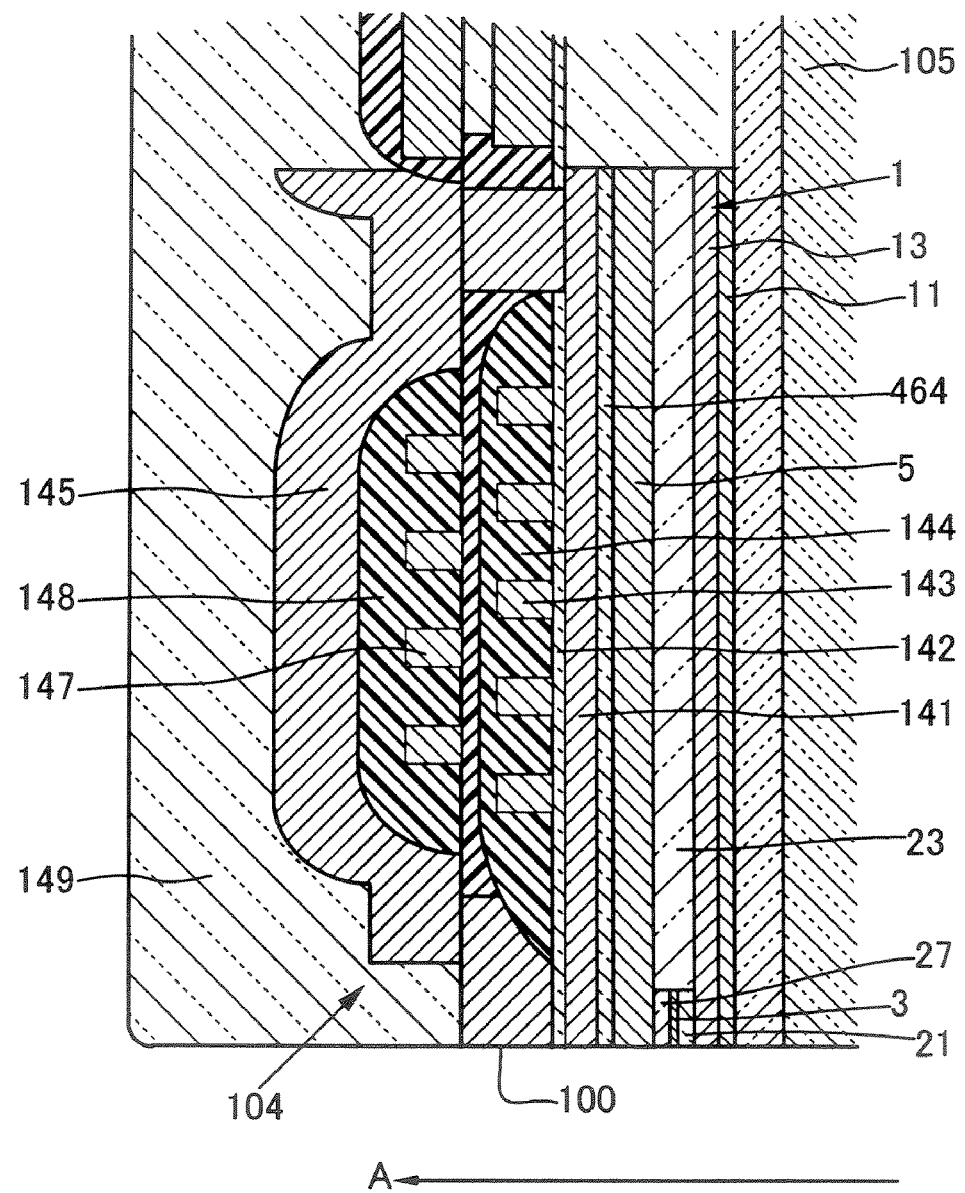
FIG. 8 is an enlarged sectional view showing an element-having portion of the thin film magnetic head shown in FIGS. 6 and 7.

FIG. 6 is a plan view showing a medium-facing side of a thin film magnetic head according to one embodiment of the present invention; FIG. 7 is a front sectional view of the thin film magnetic head shown in FIG. 6; and FIG. 8 is an enlarged sectional view showing an element-having portion of the thin film magnetic head shown in FIGS. 6 and 7. In these figures, the dimensions, proportions and the like are exaggerated or omitted for the purpose of illustration.

The illustrated thin film magnetic head comprises a slider substrate 105 and electromagnetic conversion elements 104 and 3. The slider substrate 105 may be made of a ceramic material such as AlTiC and has a geometric shape on its medium-facing side for controlling flying characteristics. In the illustrated embodiment, as a typical example of such a geometric shape, the slider substrate 105 has a base surface 150 with a first stage 151, a second stage 152, a third stage 153, a fourth stage 154 and a fifth stage 155. The base surface 150 serves as a negative pressure generation portion with respect to an air flow direction indicated by an arrow A, wherein the second stage 152 and the third stage 153 constitute a step-like air bearing which rises from the first stage 151. The surface of the second stage 152 and the surface of the third stage 153 form an ABS 100.

The fourth stage 154 rises from the base surface 150 and the fifth stage 155 rises from the fourth stage 154 in a step-like manner. The electromagnetic conversion elements 104 and 3 are disposed in the fifth stage 155.

The electromagnetic conversion elements include a magneto-resistive film 3 constituting a reproducing element and a recording element 104. For example, the recording element 104 is an induction type magnetic conversion element whose recording magnetic pole end faces the ABS 100. The recording element 104 is disposed in close proximity to the magneto-resistive film 3 constituting a reproducing element and covered with a protective film 149.

The recording element 104 includes a lower magnetic pole film 141, an upper magnetic pole film 145, a recording gap film 142, and thin film coils 143 and 147. The lower magnetic pole film 141 is magnetically coupled with the upper magnetic pole film 145. The recording gap film 142 is disposed between a magnetic pole portion of the lower magnetic pole film 141 and a magnetic pole portion of the upper magnetic pole film 145. The thin film coils 143 and 147 are disposed in an inner gap existing between the lower magnetic pole film 141 and the upper magnetic pole film 145 and insulated with insulation films 144 and 148, respectively. The recording element 104 is not limited to the above configuration but may take various forms.

The illustrated thin film magnetic head includes not only the magneto-resistive film 3 but also the lower magnetic shield film 1, the lower gap film 21, the upper gap film 27, the upper magnetic shield film 5, the insulation layer 23, and an insulation film 464. The lower magnetic shield film 1 has a layered structure of the lower shield layer 11 and the upper shield layer 13 (see FIG. 8).

The lower magnetic shield film 1 and the upper magnetic shield film 5 are spaced apart from each other with the lower gap film 21 and the upper gap film 27 interposed therebetween. Between the lower gap film 21 and the upper gap film 27, the magneto-resistive film 3 is buried.

The lower magnetic shield film 1, the upper magnetic shield film 5 and the magneto-resistive film 3 constitute the magneto-resistive element shown in FIG. 1. Accordingly, the illustrated thin film magnetic head has the effects and advantages of the magneto-resistive element shown in FIG. 1.

3. Magnetic Head Device

Figure 9:
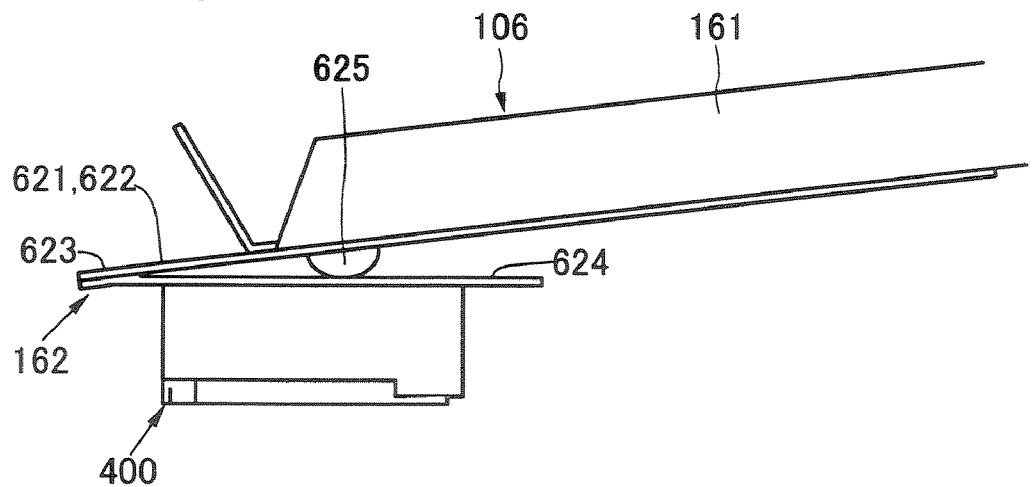
FIG. 9 is a front view of a magnetic head device according to one embodiment of the present invention.
Figure 10:
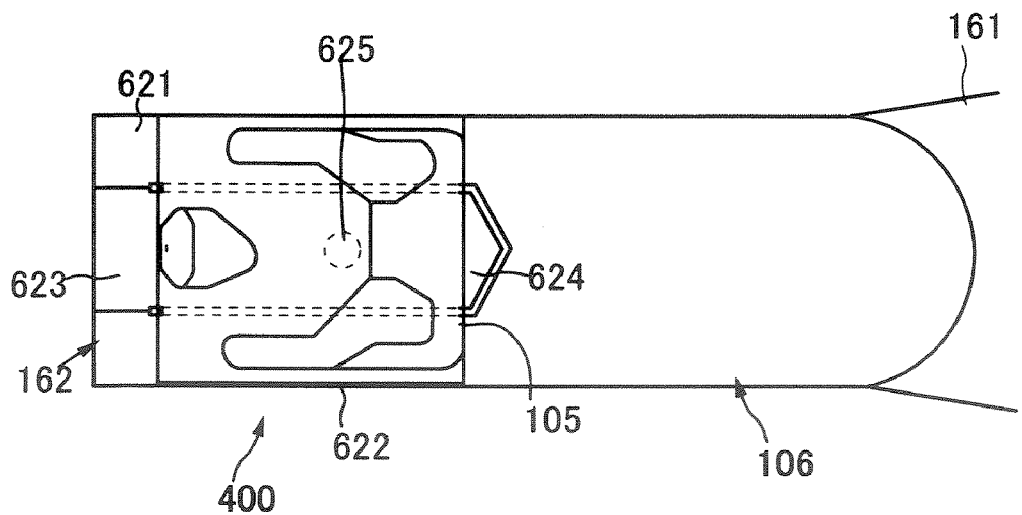
FIG. 10 is a bottom plan view of the magnetic head device shown in FIG. 9.

FIG. 9 is a front view of a magnetic head device according to one embodiment of the present invention; and FIG. 10 is a bottom plan view of the magnetic head device shown in FIG. 9. The illustrated magnetic head device comprises a thin film magnetic head 400 shown in FIGS. 6 to 8 and a head support device 106. The head support device 106 is constructed such that a flexible member 162, which is formed of a thin metal sheet, is attached to a longitudinal free end of a support member 161, which is also formed of a thin metal sheet, and the thin film magnetic head 400 is attached to a lower surface of the flexible member 162.

More specifically, the flexible member 162 includes two outer frame portions 621 and 622 extending substantially parallel to a longitudinal axis of the support member 161, a lateral frame portion 623 connecting the outer frame portions 621 and 622 at an end remote from the support member 161, and a tongue portion 624 extending substantially parallel to the outer frame portions 621 and 622 from an approximate center of the lateral fame portion 623 and having a free distal end. On the side opposite from where the lateral frame portion 623 is located, the flexible member 162 is attached near the free end of the support member 161 by means of welding or the like.

A load projection 625, which may have a semi-spherical shape, is disposed at the lower surface of the support member 161. A load force is communicated from the free end of the support member 161 to the tongue portion 624 via the load projection 625.

The thin film magnetic head 400 is attached to the lower surface of the tongue portion 624 by means of an adhesive or the like. The thin film magnetic head 400 is supported in such a manner as to permit pitching movement and rolling movement.

The head support device applicable to the present invention is not limited to the illustrated embodiment, but a wide variety of head support devices, which have been proposed or will be proposed, may also be applicable to the present invention. For example, there may be used a head support device in which the support member 161 and the tongue portion 624 are integrated by using a flexible polymeric wiring board such as a TAB tape. Furthermore, a head support device having a well-known gimbal structure can be used without restraint.

Since the thin film magnetic head 400 has the magneto-resistive element shown in FIG. 1, the magnetic head device shown in FIGS. 9 and 10 has the effects and advantages of the magneto-resistive element shown in FIG. 1.

4. Magnetic Recording/Reproducing Apparatus

FIG. 11 is a perspective view of a magnetic recording/reproducing apparatus (or a magnetic disk unit) using the magnetic head device shown in FIGS. 9 and 10. The illustrated magnetic recording/reproducing apparatus includes magnetic disks 171 which are rotatable about a shaft 170, thin film magnetic heads 172 which perform recording and reproducing of information on the magnetic disks 171, and an assembly carriage device 173 which positions the thin film magnetic heads 172 on the tracks of the magnetic disks 171.

The assembly carriage device 173 is mainly constituted of a carriage 175 which is pivotable about a shaft 174 and an actuator 176 which pivotally drives the carriage 175 and may have a voice coil motor (VCM).

Base portions of a plurality of drive arms 177 stacked along the direction of the shaft 174 are attached to the carriage 175, and a head suspension assembly 178 having the thin film magnetic head 172 mounted thereon is secured to the front end of each drive arm 177. Each head suspension assembly 178 is disposed at the front end of each drive arm 177 such that the thin film magnetic head 172 located at the front end of the head suspension assembly 178 faces the surface of each magnetic disk 171.

The drive arm 177, the head suspension assembly 178, and the thin film magnetic head 172 constitute the magnetic head device described with reference to FIGS. 9 and 10. Since the thin film magnetic head 172 has the magneto-resistive element shown in FIG. 1, the magnetic recording/reproducing apparatus shown in FIG. 11 has the effects and advantages of the magneto-resistive element shown in FIG. 1.

While the present invention has been particularly shown and described with reference to embodiments thereof, it will be understood by those skilled in the art that various changes in form and detail may be made therein without departing from the spirit, scope and teaching of the invention.

What is claimed is:

1. A magneto-resistive element, comprising:
   a lower magnetic shield film; and
   a magneto-resistive film disposed above said lower magnetic shield film,
   wherein said lower magnetic shield film comprises:
   (L1) a lower shield layer; and
   (L2) an upper shield layer,
     wherein said upper shield layer (L2) is amorphous or microcrystalline, comprising a NiFe or CoFe composition comprising B or P, and directly deposited on said lower shield layer (L1), and
     said lower shield layer (L1) is a magnetic conductive layer which is amorphous or microcrystalline with a crystal grain size in a range of 8.7 to 20 nm.

2. The magneto-resistive element of claim 1, wherein said lower shield layer (L1) comprises a NiFe or CoFe composition comprising B or P.

3. The magneto-resistive element of claim 2, wherein said lower shield layer (L1) comprises B or P in a range of 1 to 10% by atom.

4. The magneto-resistive element of claim 1, wherein said upper shield layer (L2) comprises B or P in a range of 0.3 to 10% by atom.

5. The magneto-resistive element of claim 1, wherein said lower shield layer (L1) and said upper shield layer (L2) each comprise a NiFe composition comprising Ni in a range of 81±4% by atom based on a total content of Ni and Fe in each layer (L1) and (L2).

6. The magneto-resistive element of claim 1, wherein said lower shield layer (L1) and said upper shield layer (L2) each comprise a CoFe composition comprising Co in a range of 96±3% by atom based on a total content of Co and Fe in each layer (L1) and (L2).

7. The magneto-resistive element of claim 1, further comprising an upper magnetic shield film disposed above said magneto-resistive film,
   wherein said upper magnetic shield film comprises:
   (U1) a lower shield layer; and
   (U2) an upper shield layer, wherein said upper shield layer (U2) of said upper magnetic shield film is amorphous or microcrystalline, comprising a NiFe or CoFe composition comprising B or P, and deposited on said lower shield layer (U1) of said upper magnetic shield film, and said lower shield layer (U1) of said upper magnetic shield film is a magnetic conductive layer which is amorphous or microcrystalline with a crystal grain size equal to or less than 20 nm.

8. The magneto-resistive element of claim 7, wherein said lower shield layer (U1) of said upper magnetic shield film comprises a NiFe or CoFe composition comprising B or P.

9. The magneto-resistive element of claim 8, wherein said lower shield layer (U1) of said upper magnetic shield film comprises B or P in a range of 1 to 10% by atom.

10. The magneto-resistive element of claim 7, wherein said upper shield layer (U2) of said upper magnetic shield film comprises B or P in a range of 0.3 to 10% by atom.

11. The magneto-resistive element of claim 7, wherein said lower shield layer (U1) and said upper shield layer (U2) of said upper magnetic shield film each comprise a NiFe composition comprising Ni in a range of 81±4% by atom based on a total content of Ni and Fe in each layer (U1) and (U2).

12. The magneto-resistive element of claim 7, wherein said lower shield layer (U1) and said upper shield layer (U2) of said upper magnetic shield film each comprise a CoFe composition comprising Co in a range of 96±3% by atom based on a total content of Co and Fe in each layer (U1) and (U2).

13. A magneto-resistive element comprising:
an upper magnetic shield film; and
a magneto-resistive film disposed below said upper magnetic shield film,
wherein said upper magnetic shield film comprises:
(U1) a lower shield layer; and
(U2) an upper shield layer,
wherein said upper shield layer (U2) is amorphous or microcrystalline, comprising a NiFe or CoFe composition comprising B or P, and directly deposited on said lower shield layer (U1), and
said lower shield layer (U1) is a magnetic conductive layer which is amorphous or microcrystalline with a crystal grain size in a range of 8.7 to 20 nm.

14. The magneto-resistive element of claim 13, wherein said lower shield layer (U1) comprises a NiFe or CoFe composition comprising B or P.

15. The magneto-resistive element of claim 14, wherein said lower shield layer (U1) comprises B or P in a range of 1 to 10% by atom.

16. The magneto-resistive element of claim 13, wherein said upper shield layer (U2) comprises B or P in a range of 0.3 to 10% by atom.

17. The magneto-resistive element of claim 13, wherein said lower shield layer (U1) and said upper shield layer (U2) each comprise a NiFe composition comprising Ni in a range of 81±4% by atom based on a total content of Ni and Fe in each layer (U1) and (U2).

18. The magneto-resistive element of claim 13, wherein said lower shield layer (U1) and said upper shield layer (U2) each comprise a CoFe composition comprising Co in a range of 96±3% by atom based on a total content of Co and Fe in each layer (U1) and (U2).

19. A thin film magnetic head comprising:
a magneto-resistive element; and
a slider supporting said magneto-resistive element,
wherein said magneto-resistive element comprises:
a lower magnetic shield film; and
a magneto-resistive film disposed above said lower magnetic shield film,
wherein said lower magnetic shield film comprises:
(L1) a lower shield layer; and
(L2) an upper shield layer,
wherein said upper shield layer (L2) is amorphous or microcrystalline, comprising a NiFe or CoFe composition comprising B or P, and directly deposited on said lower shield layer (L1), and
said lower shield layer (L1) is a magnetic conductive layer which is amorphous or microcrystalline with a crystal grain size in a range of 8.7 to 20 nm.

20. The thin film magnetic head of claim 19, which further comprises a write element.

21. The thin film magnetic head of claim 19, wherein said magneto-resistive element further comprises an upper magnetic shield film disposed above said magneto-resistive film,
said upper magnetic shield film comprises:
(U1) a lower shield layer; and
(U1) an upper shield layer,
wherein said upper shield layer (U2) of said upper magnetic shield film is amorphous or microcrystalline, comprising a NiFe or CoFe composition comprising B or P, and deposited on said lower shield layer (U1) of said upper magnetic shield film, and
said lower shield layer (U1) of said upper magnetic shield film is a magnetic conductive layer which is amorphous or microcrystalline with a crystal grain size equal to or less than 20 nm.

22. The thin film magnetic head of claim 21, which further comprises a write element.

23. A thin film magnetic head comprising:
a magneto-resistive element; and
a slider supporting said magneto-resistive element,
wherein said magneto-resistive element comprises:
an upper magnetic shield film; and
a magneto-resistive film disposed below said upper magnetic shield film,
wherein said upper magnetic shield film comprises:
(U1) a lower shield layer; and
(U2) an upper shield layer,
wherein said upper shield layer (U2) is amorphous or microcrystalline, comprising a NiFe or CoFe composition comprising B or P, and directly deposited on said lower shield layer (U1), and
said lower shield layer (U1) is a magnetic conductive layer which is amorphous or microcrystalline with a crystal grain size in a range of 8.7 to 20 nm.

24. The thin film magnetic head of claim 23, which further comprises a write element.

25. A magnetic head device comprising:
a thin film magnetic head; and
a head support device supporting said thin film magnetic head,
wherein said thin film magnetic head comprises:
a magneto-resistive element; and
a slider supporting said magneto-resistive element,
wherein said magneto-resistive element comprises:
a lower magnetic shield film; and
a magneto-resistive film disposed above said lower magnetic shield film,
wherein said lower magnetic shield film comprises:
(L1) a lower shield layer; and
(L2) an upper shield layer, wherein said upper shield layer (L2) is amorphous or microcrystalline, comprising a NiFe or CoFe composition comprising B or P, and directly deposited on said lower shield layer (L1), and said lower shield layer (L1) is a magnetic conductive layer which is amorphous or microcrystalline with a crystal grain size in a range of 8.7 to 20 nm.

26. The magnetic head device of claim 25, wherein said magneto-resistive element further comprises an upper magnetic shield film disposed above said magneto-resistive film, said upper magnetic shield film comprises:
(U1) a lower shield layer; and
(U2) an upper shield layer,
wherein said upper shield layer (U2) of said upper magnetic shield film is amorphous or microcrystalline, comprising a NiFe or CoFe composition comprising B or P, and deposited on said lower shield layer (U1) of said upper magnetic shield film, and
said lower shield layer (U1) of said upper magnetic shield film is a magnetic conductive layer which is amorphous or microcrystalline with a crystal grain size equal to or less than 20 nm.

27. A magnetic head device comprising:
a thin film magnetic head; and
a head support device supporting said thin film magnetic head,
wherein said thin film magnetic head comprises:
a magneto-resistive element; and
a slider supporting said magneto-resistive element,
wherein said magneto-resistive element comprises:
an upper magnetic shield film; and
a magneto-resistive film disposed below said upper magnetic shield film,
wherein said upper magnetic shield film comprises:
(U1) a lower shield layer; and
(U2) an upper shield layer,
wherein said upper shield layer (U2) is amorphous or microcrystalline, comprising a NiFe or CoFe composition comprising B or P, and directly deposited on said lower shield layer (U1), and
said lower shield layer (U1) is a magnetic conductive layer which is amorphous or microcrystalline with a crystal grain size in a range of 8.7 to 20 nm.

28. A magnetic recording/reproducing apparatus comprising:
a magnetic disk; and
a magnetic head device for writing and reading out magnetic data on and from said magnetic disk,
wherein said magnetic head device comprises:
a thin film magnetic head; and
a head support device supporting said thin film magnetic head,
wherein said thin film magnetic head comprises:
a magneto-resistive element; and
a slider supporting said magneto-resistive element,
wherein said magneto-resistive element comprises:
a lower magnetic shield film; and
a magneto-resistive film disposed above said lower magnetic shield film,
wherein said lower magnetic shield film comprises:
(L1) a lower shield layer; and
(L2) an upper shield layer,
wherein said upper shield layer (L2) is amorphous or microcrystalline, comprising a NiFe or CoFe composition comprising B or P, and directly deposited on said lower shield layer (L1), and
said lower shield layer (L1) is a magnetic conductive layer which is amorphous or microcrystalline with a crystal grain size in a range of 8.7 to 20 nm.

29. The magnetic recording/reproducing apparatus of claim 28, wherein said magneto-resistive element further comprises an upper magnetic shield film disposed above said magneto-resistive film,
said upper magnetic shield film comprises:
(U1) a lower shield layer; and
(U2) an upper shield layer,
wherein said upper shield layer (U2) of said upper magnetic shield film is amorphous or microcrystalline, comprising a NiFe or CoFe composition comprising B or P, and deposited on said lower shield layer (U1) of said upper magnetic shield film, and
said lower shield layer (U1) of said upper magnetic shield film is a magnetic conductive layer which is amorphous or microcrystalline with a crystal grain size equal to or less than 20 nm.

30. A magnetic recording/reproducing apparatus comprising:
a magnetic disk; and
a magnetic head device for writing and reading out magnetic data on and from said magnetic disk,
wherein said magnetic head device comprises:
a thin film magnetic head; and
a head support device supporting said thin film magnetic head,
wherein said thin film magnetic head comprises:
a magneto-resistive element; and
a slider supporting said magneto-resistive element,
wherein said magneto-resistive element comprises:
an upper magnetic shield film; and
a magneto-resistive film disposed below said upper magnetic shield film,
wherein said upper magnetic shield film comprises:
(U1) a lower shield layer; and
(U2) an upper shield layer,
wherein said upper shield layer (U2) is amorphous or microcrystalline, comprising a NiFe or CoFe composition comprising B or P, and directly deposited on said lower shield layer (U1), and
said lower shield layer (U1) is a magnetic conductive layer which is amorphous or microcrystalline with a crystal grain size in a range of 8.7 to 20 nm.

\* \* \* \* \*